US009785195B2

(12) United States Patent
Amarilio et al.

(10) Patent No.: US 9,785,195 B2
(45) Date of Patent: Oct. 10, 2017

(54) PORTABLE COMPUTING DEVICE WITH RETRACTING KEYS FOR TABLET USE (71) Applicant: GOOGLE INC., Mountain View, CA (US)

(72) Inventors: Omri Amarilio, Palo Alto, CA (US); Katie Leah Roberts-Hoffman, San Jose, CA (US); Kan Liu, Mountain View, CA (US); Alexander Friedrich Kuscher, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 15/069,109

(22) Filed: Mar. 14, 2016

(65) Prior Publication Data
US 2017/0262025 A1    Sep. 14, 2017

(51) Int. Cl.
G06F 1/16    (2006.01)

(52) U.S. Cl.
CPC .......... *G06F 1/1666* (2013.01); *G06F 1/1616* (2013.01)

(58) Field of Classification Search
CPC combination set(s) only.
See application file for complete search history.

(56) References Cited

U.S. PATENT DOCUMENTS

| 5,590,020 A * | 12/1996 | Sellers | G06F 1/1616 200/341 |
| 5,768,094 A * | 6/1998 | Merkel | G06F 1/1616 361/679.11 |
| 5,793,605 A * | 8/1998 | Sellers | G06F 1/1616 200/344 |
| 6,019,530 A | 2/2000 | Lanzetta et al. | |
| 6,144,554 A * | 11/2000 | Mok | G06F 1/1616 361/679.08 |
| 6,175,492 B1 * | 1/2001 | Nobuchi | G06F 1/1616 361/679.08 |
| 7,983,036 B2 * | 7/2011 | Ruch | G06F 1/1616 361/679.55 |
| 9,075,577 B2 * | 7/2015 | Huang | G06F 1/1662 |
| 9,213,372 B2 * | 12/2015 | Krumpelman | H01H 13/14 |
| 2011/0053651 A1 | 3/2011 | Miyashita et al. | |

(Continued)

FOREIGN PATENT DOCUMENTS

CN    101364139 A    2/2009

OTHER PUBLICATIONS

Invitation to Pay Add'l Fees and Partial Search Report from PCT/US2017/02214, dated Jul. 5, 2017, 12 pages.
Search Report from GB1703748.2, dated Aug. 11, 2017, 7 pages.

*Primary Examiner* — Lisa Lea Edmonds
(74) *Attorney, Agent, or Firm* — Brake Hughes Bellermann LLP (57) ABSTRACT A portable computing device may include a lid and a base. The lid may include a display on a front side of the lid. The base may be rotatably attached to the lid. The rotatable attachment of the base to the lid may enable the lid to rotate from an open position in which the lid is rotated away from the base to a tablet position in which a back side of the lid faces a bottom side of the base. The base may include a keyboard on a top side of the base and an elastic sheet extending over the keyboard. The keyboard may include keys configured to retract into the base in response to the lid rotating to the tablet position and extend out of the base in response to the lid rotating out of the tablet position.

14 Claims, 8 Drawing Sheets (56) References Cited

U.S. PATENT DOCUMENTS

| | | |
|---|---|---|
| 2013/0043115 A1 | 2/2013 | Yang et al. |
| 2013/0181909 A1* | 7/2013 | Voronel ................ G06F 1/1662 |
| | | 345/173 |
| 2014/0311880 A1 | 10/2014 | Krumpelman et al. |
| 2015/0016039 A1 | 1/2015 | Oakley |
| 2015/0316959 A1 | 11/2015 | Senatori |
| 2015/0341030 A1 | 11/2015 | De Saulles et al. |
| 2016/0161987 A1* | 6/2016 | Jacobs ................ G06F 1/1662 |
| | | 361/679.11 |

* cited by examiner

PORTABLE COMPUTING DEVICE WITH RETRACTING KEYS FOR TABLET USE

TECHNICAL FIELD

This description relates to portable computing devices.

BACKGROUND

Portable computing devices may include lids that may be rotated into a "tablet" position, in which a side of the lid opposite from a display faces a base of the portable computing device. A user may hold the portable computing device in the tablet position with the display facing the user and a keyboard on the base facing away from the user. When holding the portable computing device in the tablet position, the user's fingers may press on the keys, creating an uncomfortable, "squishy" feeling.

SUMMARY

According to one example, a portable computing device may include a lid and a base. The lid may include a display on a front side of the lid. The base may be rotatably attached to the lid. The rotatable attachment of the base to the lid may enable the lid to rotate from an open position in which the lid is rotated away from the base to a tablet position in which a back side of the lid, opposite from the front side of the lid, faces a bottom side of the base, opposite from a top side of the base. The base may include a keyboard on the top side of the base and an elastic sheet extending over the keyboard. The keyboard may include keys configured to retract into the base in response to the lid rotating to the tablet position and extend out of the base in response to the lid rotating out of the tablet position.

According to an example, a portable computing device may include a lid and a base. The lid may include a display on a front side of the lid. The base may be rotatably attached to the lid. The rotatable attachment of the base to the lid may enable the lid to rotate from an open position in which the lid is rotated away from the base to a tablet position in which a back side of the lid, opposite from the front side of the lid, faces a bottom side of the base, opposite from a top side of the base. The base may include a housing comprising a top shell and a bottom shell, the top shell defining an aperture on the top side of the base, and a keyboard in the aperture. The base may be configured to cause the top shell to move from a first shell position when the lid is in the open position, the first shell position causing the keyboard to extend away from the bottom side of the base beyond the top shell, to a second shell position away from the bottom shell when the lid is moved to the tablet position, the second shell position causing the keyboard to be flush with the top shell.

According to an example, a portable computing device may include a lid and a base. The lid may include a display on a front side of the lid. The base may be rotatably attached to the lid. The rotatable attachment of the base to the lid may enable the lid to rotate from an open position in which the lid is rotated away from the base to a tablet position in which a back side of the lid, opposite from the front side of the lid, faces a bottom side of the base, opposite from a top side of the base. The base may include a housing defining an aperture on the top side of the base, a keyboard in the aperture, the keyboard comprising keys that are biased to extend beyond the top side of the base, and an elastic, airtight material enveloping the keyboard. The base may be configured to increase an air pressure in the elastic, airtight material when the lid is in the open position, allowing the keys to extend beyond the top side of the base, and reduce the air pressure in the elastic, airtight material when the lid is in the tablet position, forcing the keys to retract into the base.

The details of one or more implementations are set forth in the accompanying drawings and the description below. Other features will be apparent from the description and drawings, and from the claims.

DETAILED DESCRIPTION

When a lid of a portable computing device is rotated into a tablet position, keys on a base of the portable computing device may retract into the base. The keys may retract into the base so that none of the keys extend beyond the base. Key retraction mechanisms may cause the keys to retract by moving down into the base, or a top shell of the base may move up so that the keys no longer extend beyond the top of the base. An elastic sheet may extend over the keyboard, so that when the keys are retracted, the sheet is flush with a top of the base, creating a flat surface across the top of the base with a pleasing appearance and feel. The elastic sheet may be a single sheet that extends only across a top side of the base and is attached to the top side of the base, or may be part of a balloon which envelops the keys so that the keys are visible to the user. When the lid is rotated out of the tablet position, the keys may extend beyond the base, pressing into and stretching the elastic sheet so that the keys are visible to the user.

Figure 1A:
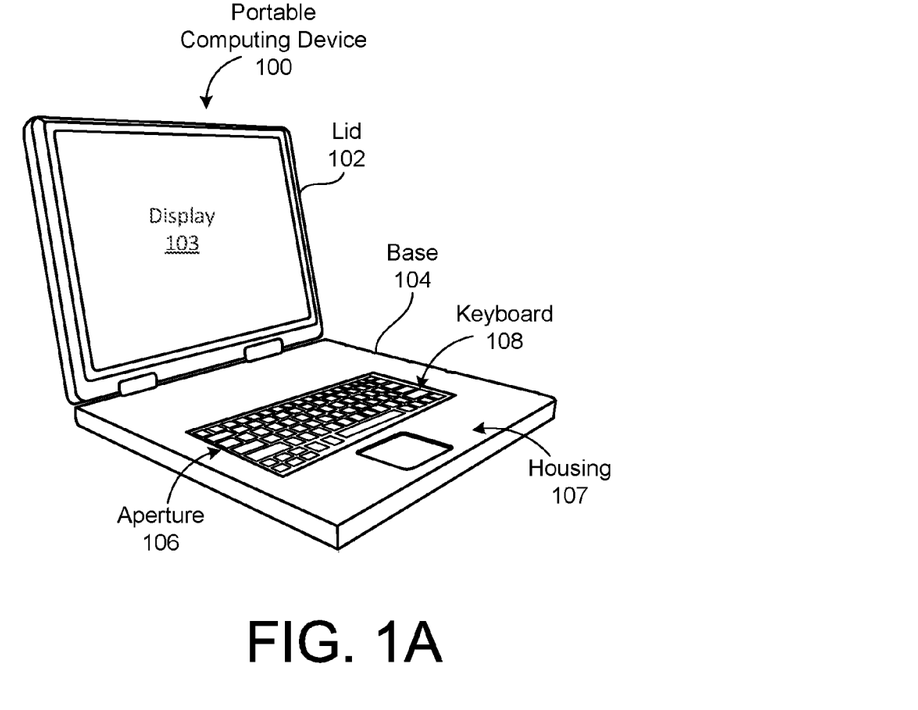
FIG. 1A is a perspective view of a portable computing device according to an example embodiment.

FIG. 1A is a perspective view of a portable computing device 100 according to an example embodiment. The portable computing device 100 may include a laptop or notebook computer, or a flipphone. The portable computing device 100 may also include a tablet computer or other type of computing device with an external keyboard with keys that retract when the computing device is not in use.

The portable computing device 100 may include a lid 102. The lid 102 may include a display 103 on a front side (labeled in FIG. 1B) of the lid 102. The display 103 may present and/or display graphical output to a user. In an example in which the display 103 is a touchscreen, the display 103 may also receive input from the user, such as tactile input when the user contacts the display 103 with one or more fingers.

The portable computing device 100 may include a base 104. The base 104 may be rotatably attached to the lid 102, and/or the lid 102 may be rotatably attached to the base 104. The rotatable attachment of the lid 102 to the base 104, and/or the base 104 to the lid 102, may enable the lid 102 to rotate from an open position shown in FIGS. 1A and 1B, in which the lid 102 is not in contact with the base 104, and/or in which the lid 102 is rotated at an angle away from the base 104, such as between forty-five degrees) (45° and three hundred fifteen degrees (315°) away from the base 104, to a tablet position shown in FIG. 1C in which a back side (not shown in FIG. 1A) of the lid 102 faces a bottom side (not shown in FIG. 1A) of the base 104, and to a closed position shown in FIG. 1D in which the front side (labeled in FIG. 1B) of the lid 102 faces a top side (labeled in FIG. 1B) of the base 104. The portable computing device 100 may have a three hundred sixty degree (360°) range of rotation from the closed position to the tablet position.

The base 104 may include a housing 107. The housing 107 may enclose components of the portable computing device 100, such as a processor, memory, bus, and other components described in greater detail with respect to FIG. 6.

The housing 107 may define an aperture 106. The aperture 106 may be an opening in the top side of the base 104. The base 104 may include a keyboard 108 in the aperture 106. The aperture 106 may allow the keyboard 108 to extend both above and below the top side of the base 104, and to couple with components inside the base 104.

The keyboard 108 may include multiple keys, such as alphanumeric keys, modifier keys, directional keys, and other keys to receive input from the user. The keyboard 108 may be coupled to the processor and/or other electronic components of the portable computing device 100, and pass the user input on to the processor and/or other electronic components of the portable computing device 100. The keys included in the keyboard 108 may be configured to retract into the base 104 in response to the lid 102 rotating into the tablet position, and extend out of the base 104 in response to the lid 102 rotating out of the tablet position and/or into the open position. When in the retracted position, end portions of the keys may be flush with, and/or not extend beyond, the top side of the base 104. The keys may extend beyond the top side of the base 104 when the lid 102 and/or portable computing device 100 is in the open position.

Figure 1B:
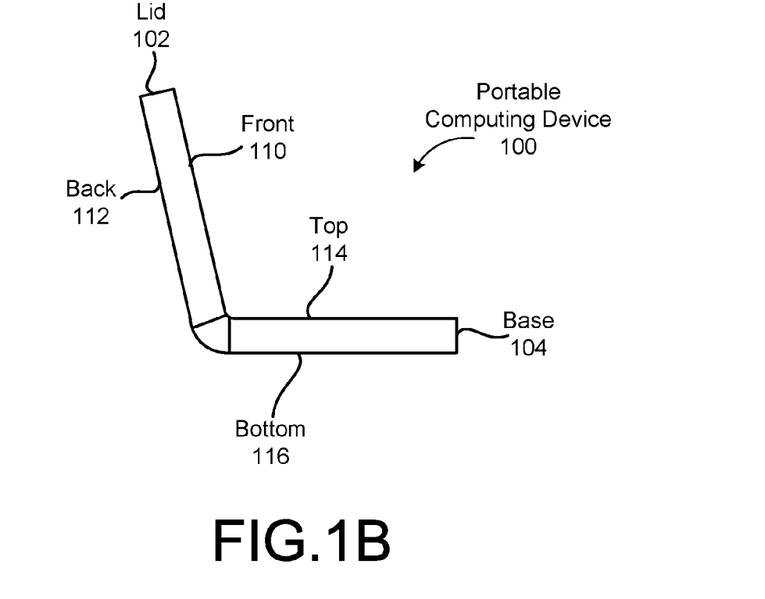
FIG. 1B is a side view of the portable computing device in an open position according to an example embodiment.

FIG. 1B is a side view of the portable computing device 100 in the open position according to an example embodiment. As shown in FIG. 1B, the lid 102 may be rotated away from the base 104, such as at an angle of between forty-five degrees (45°) and three hundred fifteen degrees (315°) away from the base 104. The lid 102 may include a front side 110 that includes the display 103 (not shown in FIG. 1B), and a back side 112 that is opposite from the front side 110. The base 104 may include a top side 114, which includes the keyboard 108 (not shown in FIG. 1B), and a bottom side 116 that is opposite from the top side 114. When the portable computing device 100 is used in the open position, the bottom side 116 of the base 104 of the portable computing device 100 may rest on a flat surface, such as a top of a table.

Figure 1C:
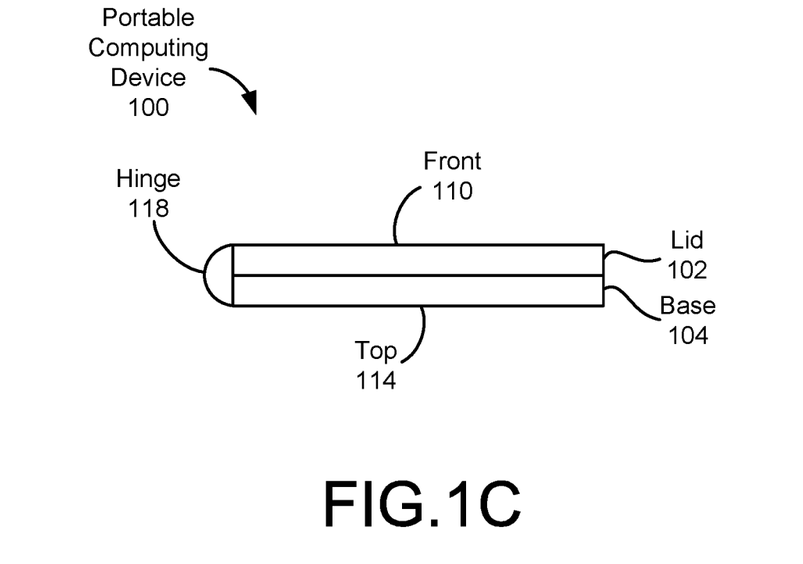
FIG. 1C is a side view of the portable computing device in a tablet position according to an example embodiment.

FIG. 1C is a side view of the portable computing device 100 in the tablet position according to an example embodiment. As shown in FIG. 1C, when the portable computing device 100 is in the tablet position, the back side 112 (not labeled in FIG. 1C) of the lid 102, which is opposite from the front side 110, faces and/or is in contact with the bottom side 116 (not labeled in FIG. 1C) of the base 104, which is opposite from the top side 114. The portable computing device 100 may include a hinge 118 that rotatably attaches the lid 102 and base 104 to each other, enabling the rotation of the lid 102 with respect to the base 104. When the portable computing device 100 is in the tablet position, the user may interact with the display 103 (not shown in FIG. 1C) on the front side 110 of the lid 102, such as by touches and gestures on the display 103.

Figure 1D:
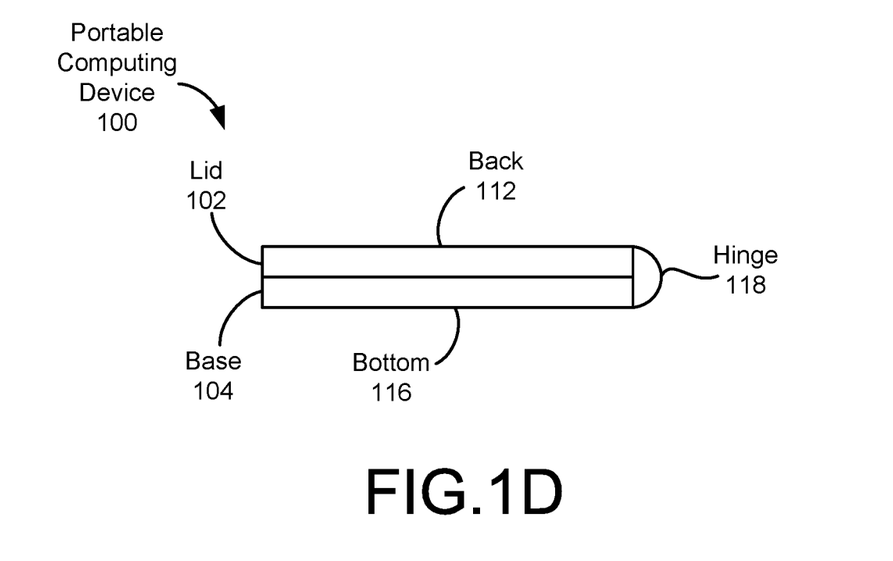
FIG. 1D is a side view of the portable computing device in a closed position according to an example embodiment.

FIG. 1D is a side view of the portable computing device 100 in the closed position according to an example embodiment. As shown in FIG. 1D, when the portable computing device 100 is in the closed position, the front side 110 (not labeled in FIG. 1D) of the lid 102, which is opposite from the back side 112, faces and/or is in contact with the top side 114 (not labeled in FIG. 1) of the base 104, which is opposite from the bottom side 116. In an example embodiment, when the portable computing device 100 is in the closed position, the keys may retract into the base 104, as described herein with respect to the tablet position. In another example embodiment, when the portable computing device 100 is in the closed position, the keys may extend out of the base 104, as described herein with respect to the open position.

Figure 2A:
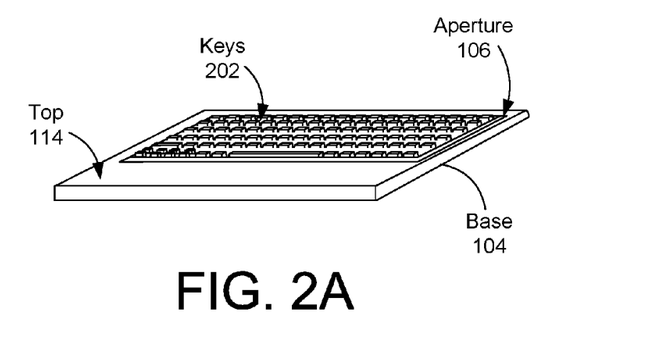
FIG. 2A is a perspective view of a base of the portable computing device with keys extending beyond the base according to an example embodiment.

FIG. 2A is a perspective view of the base 104 of the portable computing device 100 with keys 202 extending beyond the base 104 according to an example embodiment. In this example, the portable computing device 100 may be in the open position, causing the keys 202 to extend out of the base 104. When the portable computing device 100 is in the open position, the keys 202, which may be included in the keyboard 108 (not labeled in FIG. 2A), may extend beyond the top side 114 of the base 104.

Figure 2B:
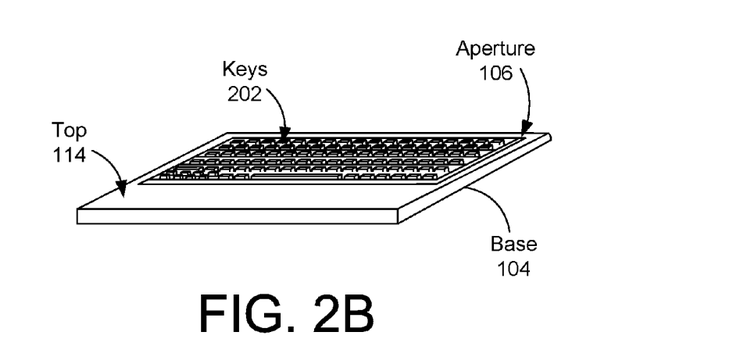
FIG. 2B is a perspective view of the base of the portable computing device with the keys retracted into the base according to an example embodiment.

FIG. 2B is a perspective view of the base 104 of the portable computing device 100 with the keys 202 retracted into the base 104 according to an example embodiment. In this example, the portable computing device 100 may be in the tablet position, causing the keys 202 to retract into the base 104. When the portable computing device 100 is in the tablet position, the keys 202 may retract into the base 104 and end portions of the keys 202 may be flush with, and/or not extend beyond, the top side 114 of the base 104. Each key 202 may include a key retraction mechanism that retracts the associated one key 202 into the base 104 in response to the lid 102 rotating to the tablet position and extends the one associated key 202 out of the base 104 in response to the lid 102 rotating out of the tablet position and into the open position. The key retraction mechanism may include all mechanical elements, a combination of mechanical and magnetic elements as shown and described with respect to FIGS. 4A, 4B, 4C, and 4D, and/or a combination of mechanical and air pressure elements as shown and described with respect to FIGS. 5A and 5B. The keys 202 in the retracted position may be at a lowest point, so that if a user presses on the keys 202 in the retracted position, the keys will not retract any further, obviating any "squishy" feeling from holding the portable computing device 100 with fingers on the keys 202.

Figure 2C:
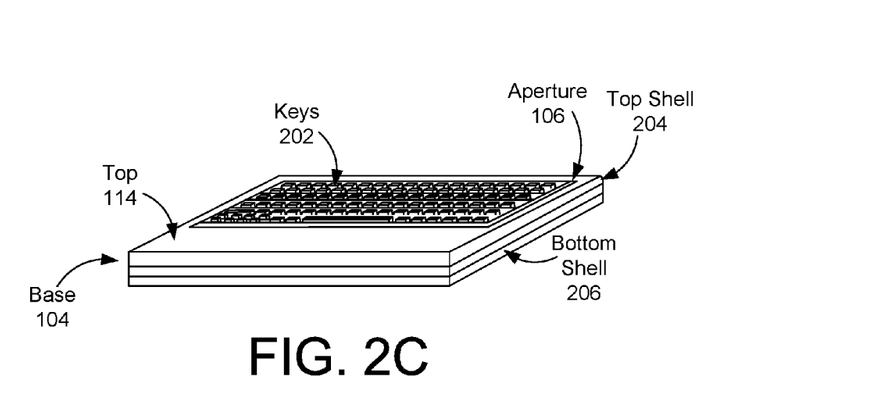
FIG. 2C is a perspective view of the base of the portable computing device with a top shell of the base elevated so that the keys are flush with the top shell according to an example embodiment.

FIG. 2C is a perspective view of the base 104 of the portable computing device 100 with a top shell 204 of the base 104 elevated so that the keys 202 are flush with the top shell 204 according to an example embodiment. In this example, the base 104 may include a top shell 204, which includes the top side 114 of the base 104 and defines the aperture 106, and a bottom shell 206, which includes the bottom side 116 (not labeled in FIG. 2C). In this example, when the lid 102 (not shown in FIG. 2C) rotates to put the portable computing device 100 into the tablet position, the keys 202 may remain in place, but the top shell 204 may move up and away from the bottom shell 206, so that the keys 202 are flush with, and/or do not extend beyond, the top side 114 of the top shell 204 of the base 104.

Figure 3A:
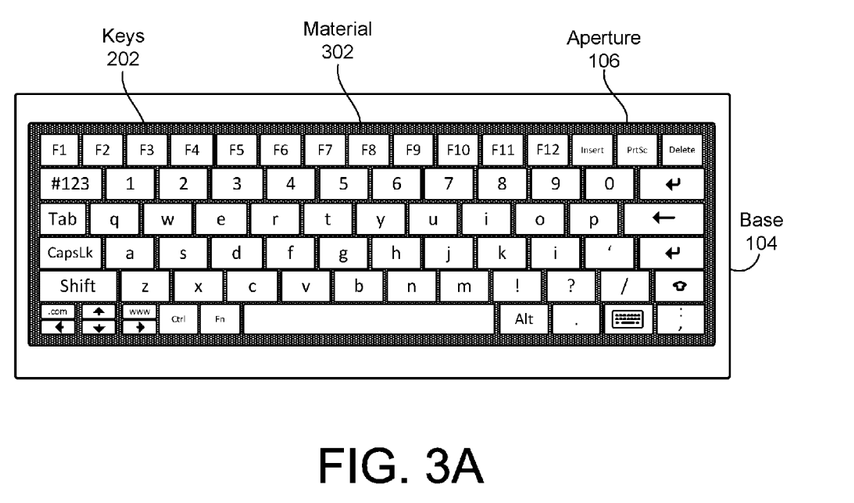
FIG. 3A is a top view of the base of the portable computing device with material extending over the keys in an example in which the keys press into the material.

FIG. 3A is a top view of the base 104 of the portable computing device 100 with material 302 extending over the keys 202 in an example in which the keys 202 press into the material 302. In this example, the portable computing device 100 may be in the open position with the keys 202 extending beyond top side 114 of the base 104, as shown and described with respect to FIG. 2A. In an example embodiment, the material 302 may be an elastic sheet and/or rubber sheet extending over the keyboard 108 (not labeled in FIG. 3A) that includes the keys 202. In another example, the material 302 may be part of an elastic, airtight material enveloping the keyboard 108 and/or keys 202.

The keys 202 may press into the material 302, forming ridges for the user to identify as the keys 202. In an example embodiment, the material 302 may be transparent, making the keys visible through the material 302, so that the user may identify the keys 202. In another example embodiment, the material 302 may include printed letters aligned with corresponding keys 202 so that the user may identify the keys 202.

Figure 3B:
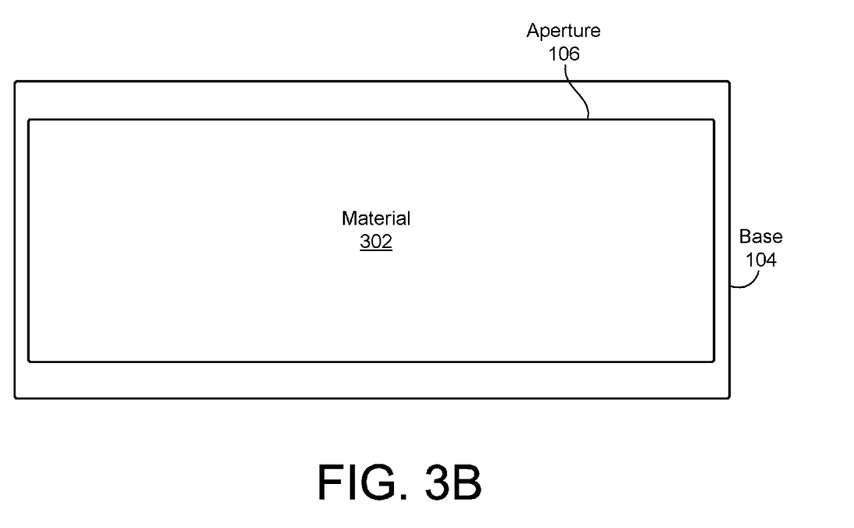
FIG. 3B is a top view of the base of the portable computing device with the material extending over the keys in an example in which the keys are retracted and the material is flush with a top side of the base.

FIG. 3B is a top view of the base 104 of the portable computing device 100 with the material 302 extending over the keys 202 (not shown in FIG. 3B) in an example in which the keys 202 are retracted and the material 302 is flush with the top side 114 of the base 104. In this example, the portable computing device 100 may be in the tablet position, with the keys 202 retracted into the base 104 so that the keys 202 are flush with, or below, the top side 114 of the base 104, as shown and described with respect to FIGS. 2B and 2C. With the keys 202 retracted, the material 302 may be flush with the top side 114 of the base 104, making the base 104 look and/or feel flat and/or smooth.

Figure 4A:
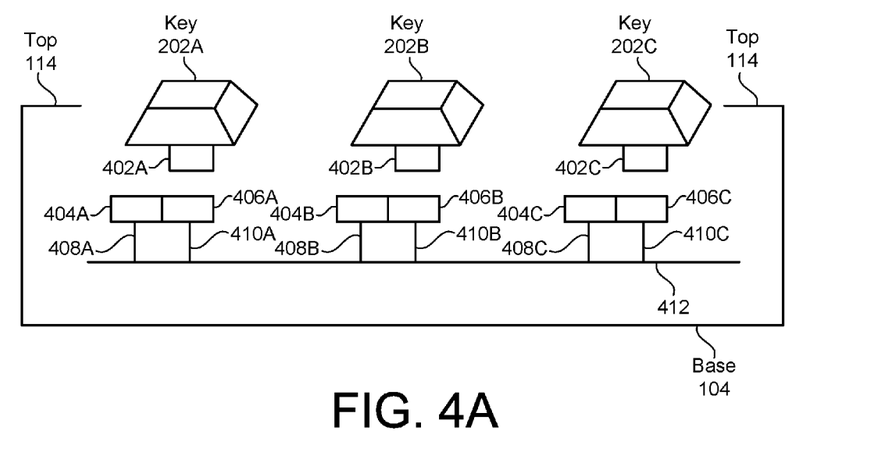
FIG. 4A shows keys with key magnets in an example in which base magnets with same polarities cause the keys to extend beyond a top side of the base.

FIG. 4A shows keys 202A, 202B, 202C (collectively keys 202) with key magnets 402A, 402B, 402C (collectively key magnets 402) in an example in which base magnets 406A, 406B, 406C (collectively base magnets 406) with same polarities cause the keys 202 to extend beyond a top side 114 of the base 104. While three keys 202 and associated magnets 402, 404, 406 are shown in FIGS. 4A, 4B, 4C, and 4D, the features described herein may be included in all the keys included in the keyboard 108.

In this example, the keys 202 may include key magnets 402 mounted onto the keys 202 on sides of the keys 202 facing toward the bottom side 116 of the base 104. The keys 202 may be biased and/or spring-loaded to extend out of the base 104, and the attracting force of the base magnets 404 of opposite polarities from the key magnets 402 may overcome the biasing force and cause the keys 202 to retract into the base 104. The combination of biased key 202, magnets 402, 404, 406, and position controller 412 may form a key retraction mechanism that retracts the keys 202 when the portable computing device 100 is in the tablet position and extends the keys 202 when the portable computing device 100 is in the open position.

The base 104 may include base magnets 406 with same polarities as the key magnets 402, which repel the key magnets 402, as well as base magnets 404 with opposite polarities as the key magnets 402, which attract the key magnets 402. The base magnets 404, 406 may be attached to a position controller 412 in the base 104 by mounts 408A, 408B, 408C, 410A, 410B, 410C (collectively 408, 410). The position controller 412 may be a planar object that is mechanically coupled to the base magnets 404, 406. The position controller 412 may shift the base magnets 404, 406 to control which base magnets 404, 406 are adjacent to the key magnets 402. Adjacency of a base magnet 404, 406 may imply greater proximity to, or being closer to the key magnet 402, than the other base magnet 404, 406. When the portable computing device 100 is in the open position, the position controller 412 may shift so that the base magnets 406 with same polarities as the key magnets 402 are adjacent to the key magnets 402, repelling the key magnets 402 and forcing the keys 202 to extend beyond the top side 114 of the base 104, as shown in FIG. 4A. When the portable computing device 100 is in the tablet position, the position controller 412 may shift so that the base magnets 404 with opposite polarities as the key magnets 402 are adjacent to the key magnets 402, attracting the key magnets 402 and causing the keys 202 be flush with or below the top side 114 of the base 104, as shown in FIG. 4B.

Figure 4B:
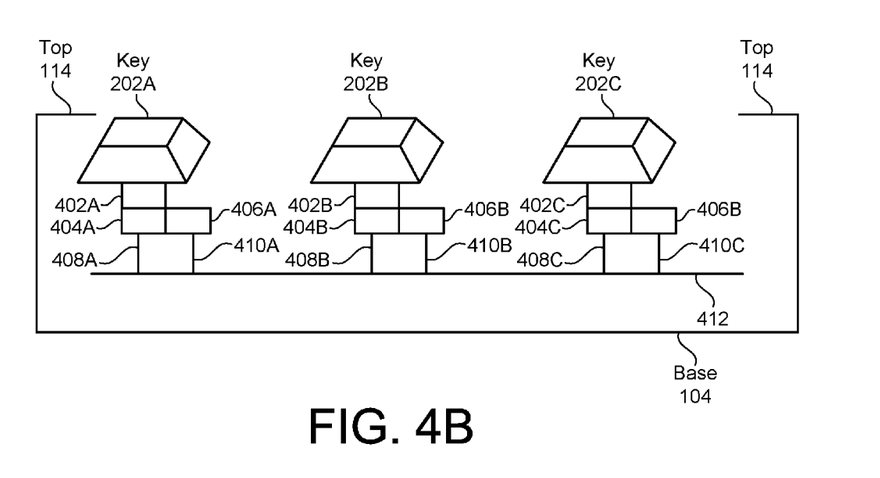
FIG. 4B shows the keys with key magnets in an example in which the base magnets have been shifted so that base magnets with opposite polarities cause the keys to retract into the base.

FIG. 4B shows the keys 202 with key magnets 402 in an example in which the base magnets 404, 406 have been shifted so that base magnets 404 with opposite polarities cause the keys 202 to retract into the base 104. In this example, the position controller 412 has shifted to the right, causing the base magnets 404 with opposite polarities from the key magnets 402 to be adjacent to the key magnets 402, attracting the key magnets 402 toward the bottom side 116 of the base 104, pulling the keys 202 downward so that the keys 202 are flush with and/or below the top side 114 of the base 104.

Figure 4C:
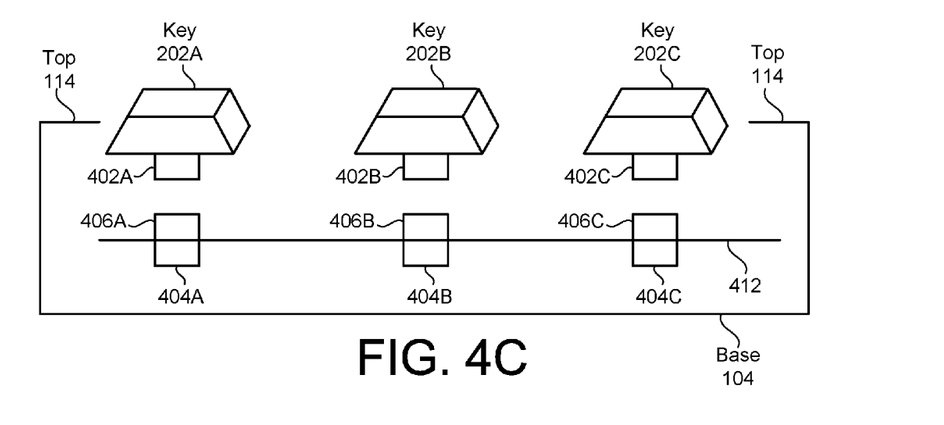
FIG. 4C shows the keys with key magnets in another example in which base magnets with same polarities as the key magnets cause the keys to extend beyond the top side of the base.

FIG. 4C shows the keys 202 with key magnets 402 in another example in which base magnets 406 with same polarities as the key magnets 402 cause the keys 202 to extend beyond the top side 114 of the base 104. In this example, as in the example shown and described with respect to FIG. 4A, the portable computing device 100 is in the open position and the base magnets 406 with same polarities as the key magnets 402 are adjacent to the key magnets 402, repelling the key magnets 402 and forcing the keys 202 to extend beyond the top side 114 of the base 104. In this example, the position controller 412 may be a rod which controls which base magnets 404, 406 are adjacent to the key magnets 402 by rotating the base magnets 404, 406.

Figure 4D:
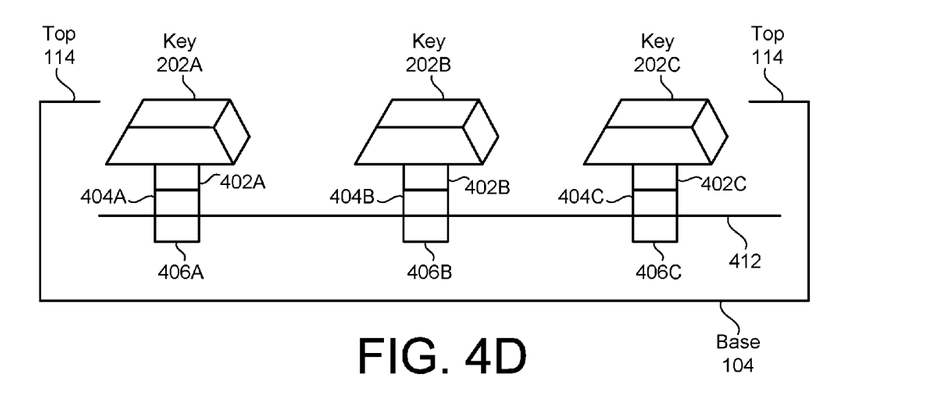
FIG. 4D shows the keys with magnets in an example in which the base magnets have been rotated so that base magnets with opposite polarities from the key magnets cause the keys to retract into the base.

FIG. 4D shows the keys 202 with key magnets 402 in an example in which the base magnets 404, 406 have been rotated so that base magnets 404 with opposite polarities from the key magnets 402 cause the keys 202 to retract into the base 104. In this example, the position controller 412 has rotated so that the base magnets 404 with opposite polarities from the key magnets 402 are adjacent to the key magnets 402. The adjacency of the base magnets 404 with opposite polarities from the key magnets 402 attracts the key magnets 402 to the base magnets 404, causing the keys 202 to retract into the base 104 and be flush with and/or below the top side 114 of the base 104.

Figure 5A:
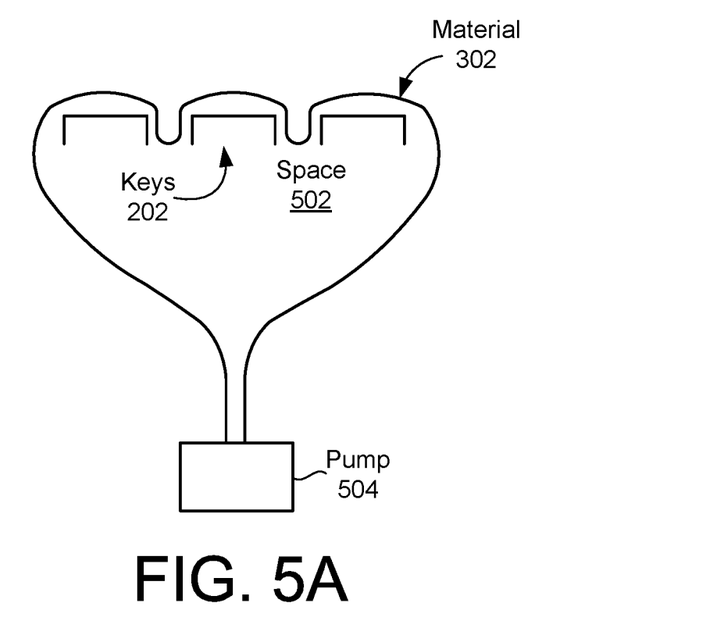
FIG. 5A shows the material enveloping the keys in an example in which a pump pumps air into a material enveloping the keys.

FIG. 5A shows the material 302 enveloping the keys 202 in an example in which a pump 504 pumps air into the material 302 enveloping the keys 202. In this example, the material 302 may include an elastic, airtight material enveloping the keyboard 108 and/or keys 202, forming a balloon. The combination of biased key 202, airtight, enveloping material, and pump 504 may form a key retraction mechanism that retracts the keys 202 when the portable computing device 100 is in the tablet position and extends the keys 202 when the portable computing device 100 is in the open position.

A contracting force of the material 302 may be greater than a combination of an outwardly biased force of the keys and an air pressure of air inside a space 502 enclosed by the material 302, causing the keys 202 to retract into the base 104 (not shown in FIG. 5A) when the portable computing device 100 is in the tablet position. When the portable computing device 100 rotates out of the tablet position, the pump 504 may pump air into the material 302, increasing the air pressure inside the space 502 enclosed by the material 302. With the air pumped into the space 502, the combination of the air pressure in the space 502 and the biasing force of the keys 202 may be greater than the contracting force of the material, allowing the keys 202 to extend beyond the top side 114 of the base 104.

Figure 5B:
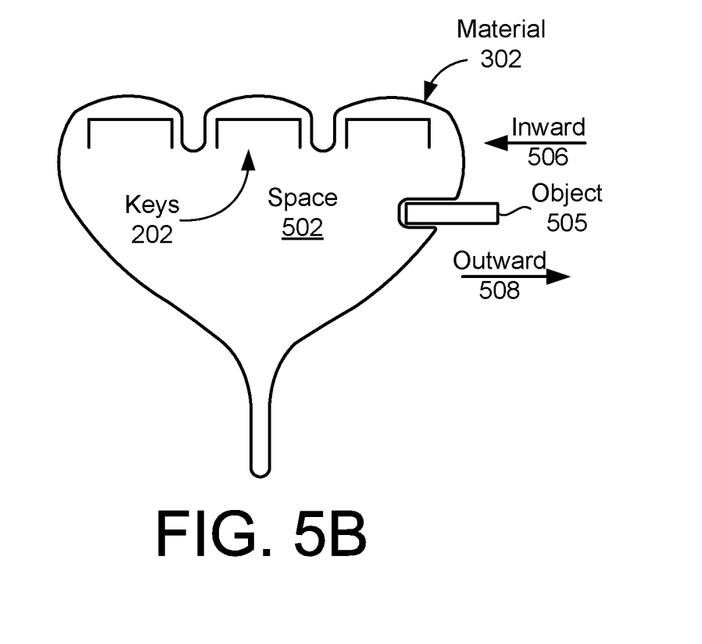
FIG. 5B shows the material enveloping the keys in an example in which an object changes a volume of space enveloped by the material.

FIG. 5B shows the material 302 enveloping the keys 202 in an example in which an object 505 changes a volume of space 502 enveloped by the material 302. The object 505 may include a pin or a rod. In this example, as in the example described with respect to FIG. 5A, the material 302 may include an elastic, airtight material enveloping the keyboard 108 and/or keys 202, forming a balloon, and the contracting force of the material 302 may cause the keys 202 to retract into the base 104. The combination of biased key 202, airtight, enveloping material, and object 505 may form a key retraction mechanism that retracts the keys 202 when the portable computing device 100 is in the tablet position and extends the keys 202 when the portable computing device 100 is in the open position.

In this example, when the portable computing device 100 is rotated out of the tablet position, the object 505 may move inward 506 to extend into the balloon formed by the material 302, reducing a volume of the space 502 enveloped by the material 302. The reduction of volume of the space 502 may increase the air pressure inside the balloon formed by the material 302, and the combination of the biasing force of the keys 202 and the air pressure of the balloon may be greater than the contracting force of the material 302, allowing the keys 202 to extend out of the base 104.

When the portable computing device 100 is rotated into of the tablet position, the object 505 may move outward 508 away from the balloon formed by the material 302, increasing a volume of the space 502 enveloped by the material 302. The increase of volume of the space 502 may decrease the air pressure inside the balloon formed by the material 302, and the combination of the biasing force of the keys 202 and the air pressure of the balloon may be less than the contracting force of the material 302, causing the keys 202 to retract back into the base 104.

Figure 6:
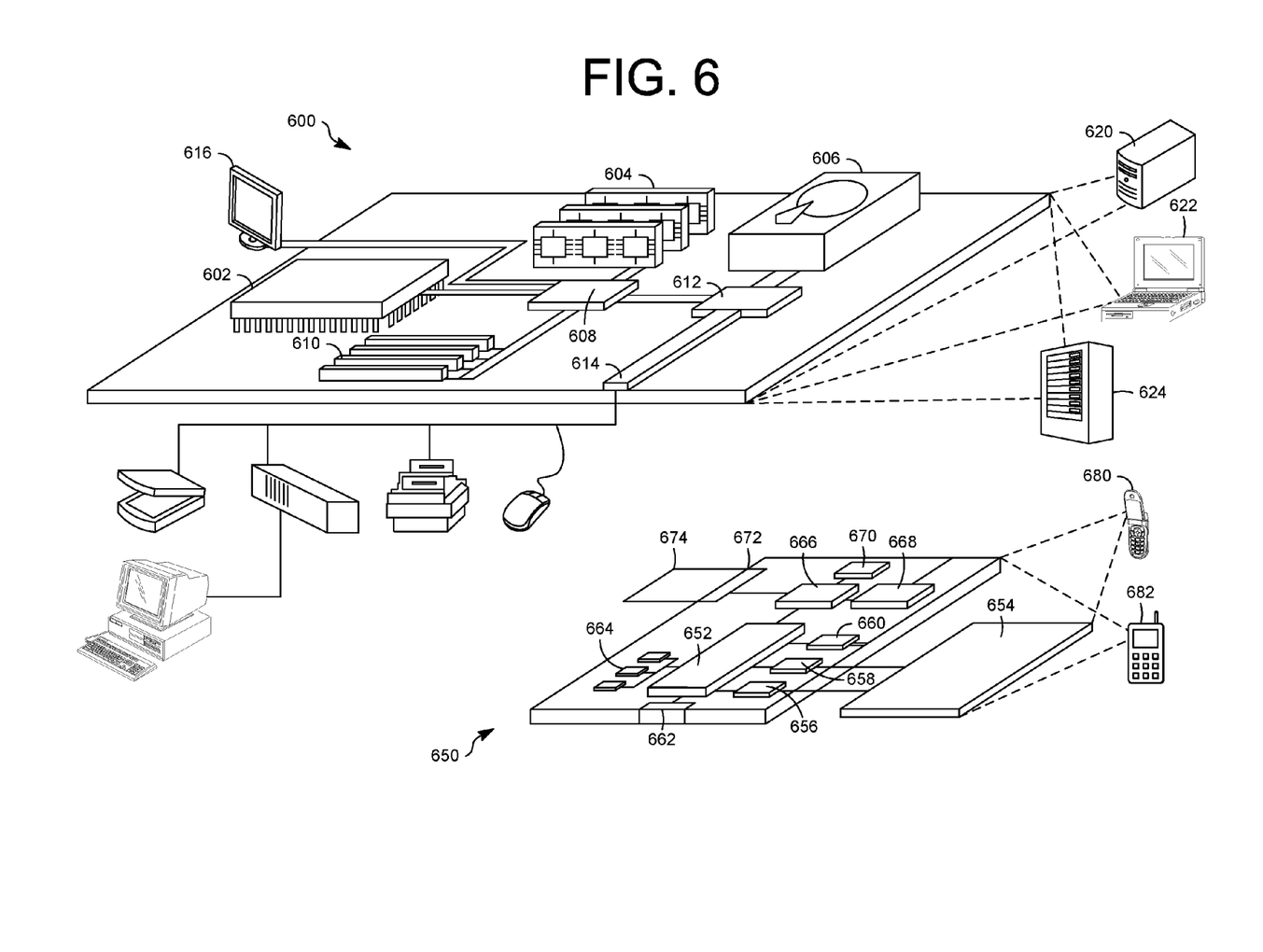
FIG. 6 shows an example of a computer device and a mobile computer device that can be used to implement the techniques described here.

FIG. 6 shows an example of a generic computer device 600 and a generic mobile computer device 650, which may be used with the techniques described here. Features described with respect to the computer device 600 and/or mobile computer device 650 may be included in the portable computing device 100 described above. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A portable computing device comprising:
    a lid comprising a display on a front side of the lid; and
    a base rotatably attached to the lid, the rotatable attachment of the base to the lid enabling the lid to rotate from an open position in which the lid is rotated away from the base to a tablet position in which a back side of the lid, opposite from the front side of the lid, faces a bottom side of the base, opposite from a top side of the base, the base comprising:
        a keyboard on the top side of the base, the keyboard comprising keys configured to retract into the base in response to the lid rotating to the tablet position and extend out of the base in response to the lid rotating out of the tablet position, the keys comprising key magnets on a side of the keys facing the base, the key magnets comprising a first polarity;
        a pair of base magnets associated with each key and key magnet, each pair of base magnets including a first base magnet of the first polarity and a second base magnet of a second polarity, the base being configured to:
            cause the first base magnet to be adjacent to the associated key magnet when the lid is rotated into the open position, causing the associated key to extend out of the base; and
            cause the second base magnet to be adjacent to the associated key magnet when the lid is rotated into the tablet position, causing the associated key to retract into the base; and
        an elastic sheet extending over the keyboard.

2. The portable computing device of claim 1, wherein the elastic sheet comprises a rubber sheet extending over the keyboard.

3. The portable computing device of claim 1, wherein the elastic sheet comprises a transparent material.

4. The portable computing device of claim 1, wherein the elastic sheet comprises printed letters, the printed letters being aligned with corresponding keys.

5. The portable computing device of claim 1, wherein the keyboard and the elastic sheet are configured to cause the elastic sheet to be flush with the top side of the base when the keys are retracted into the base.

6. The portable computing device of claim 1, wherein the base is configured to:
    cause the second base magnet to shift away from the key magnet and the first base magnet to shift to a position adjacent to the associated key magnet when the lid is rotated into the open position, causing the associated key to extend out of the base; and
    cause the first base magnet to shift away from the key magnet and the second base magnet to shift to a position adjacent to the associated key magnet when the lid is rotated into the tablet position, causing the associated key to retract into the base.

7. The portable computing device of claim 1, wherein the base is configured to rotate a rod in response to the lid rotating with respect to the base, the rotating of the rod causing:
    the second base magnet to rotate away from the key magnet and the first base magnet to rotate to a position adjacent to the associated key magnet when the lid is rotated into the open position, causing the associated key to extend out of the base; and
    the first base magnet to rotate away from the key magnet and the second base magnet to rotate to a position adjacent to the associated key magnet when the lid is rotated into the tablet position, causing the associated key to retract into the base.

8. A portable computing device comprising:
a lid comprising a display on a front side of the lid; and
a base rotatably attached to the lid, the rotatable attachment of the base to the lid enabling the lid to rotate from an open position in which the lid is rotated away from the base to a tablet position in which a back side of the lid, opposite from the front side of the lid, faces a bottom side of the base, opposite from a top side of the base, the base comprising:
   a housing defining an aperture on the top side of the base;
   a keyboard in the aperture, the keyboard comprising keys that are biased to extend beyond the top side of the base; and
   an elastic, airtight material enveloping the keyboard,
   the base being configured to:
      increase an air pressure in the elastic, airtight material when the lid is in the open position, allowing the keys to extend beyond the top side of the base; and
      reduce the air pressure in the elastic, airtight material when the lid is in the tablet position, forcing the keys to retract into the base.

9. The portable computing device of claim 8, wherein the elastic, airtight material comprises a balloon enveloping the keyboard.

10. The portable computing device of claim 8, wherein the elastic, airtight material is configured to be flush with the top side of the base when the lid is in the tablet position.

11. The portable computing device of claim 8, wherein the elastic, airtight material and the keys are configured to be flush with the top side of the base when the lid is in the tablet position.

12. The portable computing device of claim 8, wherein:
   the keys are biased to extend beyond the top side of the base; and
   a combination of a biasing force of the keys and the air pressure in the elastic airtight material is greater than a contracting force of the elastic, airtight material when the lid is in the open position, and is less than the contracting force of the elastic, airtight material when the lid is in the tablet position.

13. The portable computing device of claim 8, wherein the base further comprises a pump configured to increase the air pressure by pumping air into the elastic, airtight material when the lid is rotated out of the tablet position.

14. The portable computing device of claim 8, wherein the base further comprises a mechanism configured to increase the air pressure by reducing a volume of space enveloped by the elastic, airtight material when the lid is rotated into the tablet position and reduce the air pressure by increasing the volume of space enveloped by the elastic, airtight material when the lid is rotated out of the tablet position.

* * * * *

UNITED STATES PATENT AND TRADEMARK OFFICE
CERTIFICATE OF CORRECTION

PATENT NO. : 9,785,195 B2
APPLICATION NO. : 15/069109
DATED : October 10, 2017
INVENTOR(S) : Omri Amarilio et al.

It is certified that error appears in the above-identified patent and that said Letters Patent is hereby corrected as shown below:

In the Specification

Column 3, Line 39, delete "forty-five degrees) (45°"", and insert -- forty-five degrees (45°) --, therefor.

Signed and Sealed this
First Day of May, 2018

Andrei Iancu
*Director of the United States Patent and Trademark Office*